United States Patent [19]

Doolittle

[11] Patent Number: 5,737,995
[45] Date of Patent: Apr. 14, 1998

[54] POWER STEERING SYSTEM

[75] Inventor: Marc H. Doolittle, Kingsport, Tenn.

[73] Assignee: TRW Inc., Lyndhrust, Ohio

[21] Appl. No.: 608,138

[22] Filed: Feb. 28, 1996

[51] Int. Cl.⁶ .................................................. F15B 9/10
[52] U.S. Cl. ................................................... 91/375 R
[58] Field of Search ............................. 91/375 R, 375 A

[56]  References Cited

U.S. PATENT DOCUMENTS

| | | | |
|---|---|---|---|
| 4,217,932 | 8/1980 | Bacardit | 91/375 R |
| 4,619,339 | 10/1986 | Futaba et al. | 91/375 A |
| 4,819,545 | 4/1989 | Dymond. | |
| 4,858,712 | 8/1989 | Neff. | |
| 5,135,068 | 8/1992 | Emori et al. | 91/375 A |
| 5,293,954 | 3/1994 | Dymond. | |
| 5,339,917 | 8/1994 | Eberhart. | |
| 5,357,845 | 10/1994 | Sangret. | |
| 5,465,805 | 11/1995 | Sangret | 91/375 A |

*Primary Examiner*—F. Daniel Lopez
*Attorney, Agent, or Firm*—Tarolli, Sundheim, Covell, Tummino & Szabo

[57]  ABSTRACT

A power steering control valve (22) includes inner and outer valve members (40 and 42) which are rotatable relative to each other. A force transmitting assembly (114) is operable to transmit force which resists relative rotation between the valve members. A pressure chamber (138) is connected in fluid communication with a pump (24) and controls operation of the force transmitting assembly (114). The pump (24) supplies fluid at a relatively high flow rate during operation of the pump at a low speed and supplies fluid at a relatively low flow rate during operation of the pump at a relatively high speed. A secondary valve assembly (170) is connected in fluid communication with the pressure chamber (138) and defines an orifice (182 or 184) through which pressure is vented from the pressure chamber. The secondary valve assembly (170) is operated in response to relative rotation between the inner and outer valve members (40 and 42).

13 Claims, 3 Drawing Sheets

POWER STEERING SYSTEM

BACKGROUND OF THE INVENTION

The present invention relates to a vehicle power steering system and more specifically to a vehicle power steering system in which the resistance to actuation of a power steering motor control valve is varied.

A known vehicle power steering system is disclosed in U.S. Pat. No. 4,819,545. The power steering system disclosed in this patent includes a control valve assembly having a resistance to actuation which increases as vehicle speed increases. A speed responsive control unit is connected in fluid communication with a pressure responsive control unit in the valve assembly. The construction of this known power steering system would be simplified if the speed responsive control unit was eliminated.

SUMMARY OF THE INVENTION

The present invention provides a new and improved apparatus for use in a vehicle to control a flow of fluid to a power steering motor. The apparatus includes motor control valve members which are rotatable relative to each other to control fluid flow from a pump to a power steering motor. A biasing assembly resists relative rotation between the motor control valve members.

The biasing assembly includes a pressure chamber and a force transmitting assembly. The pressure chamber is operable under the influence of fluid pressure to actuate the force transmitting assembly. The pressure chamber is vented through a secondary valve which is operable in response to relative rotation between the motor control valve members.

The pump which supplies fluid to the motor control valve members and to the pressure chamber is of the type which supplies fluid at a high fluid flow rate during operation of the pump at a low speed and supplies fluid at a low fluid flow rate during operation of the pump at a high speed. During operation of the pump at the low speed, an orifice in the secondary valve assembly is effective to restrict fluid flow to enable the fluid pressure in the pressure chamber to increase. The increased fluid pressure in the pressure chamber effects operation of the force transmitting assembly to reduce the resistance to relative rotation between the motor control valve members upon the occurrence of relative rotation between the motor control valve members.

During operation of the pump at a high speed, the orifice in the secondary valve assembly is ineffective to restrict fluid flow sufficiently to effect an increase the fluid pressure in the pressure chamber. As a result, the force transmitting assembly is not fully actuated to reduce the resistance to relative rotation between the motor control valve members. Therefore, the resistance to relative rotation between the motor control valve members during operation of the pump at a high speed is greater than the resistance to relative rotation between the motor control valve members during operation of the pump at a low speed.

BRIEF DESCRIPTION OF THE DRAWINGS

The foregoing and other features of the present invention will become more apparent upon a consideration of the following description taken in connection with the accompanying drawings, wherein.

DESCRIPTION OF ONE SPECIFIC PREFERRED EMBODIMENT OF THE INVENTION

Power Steering System—General Description

Figure 1:
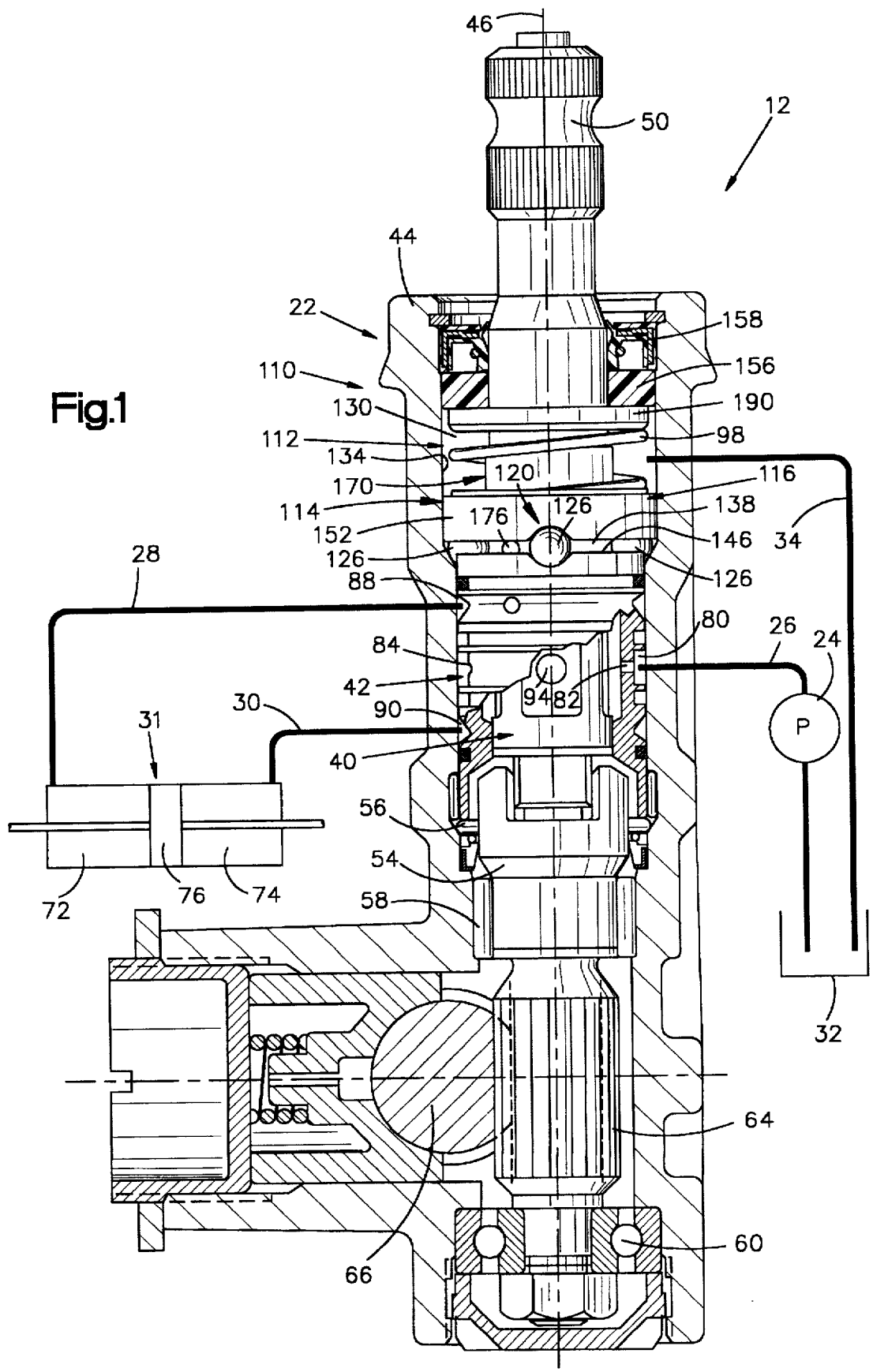
FIG. 1 is a sectional view of a power steering control valve which is used in a vehicle to control a flow of fluid to a power steering motor.

A vehicle power steering system 12 (FIG. 1) is operable to turn steerable vehicle wheels upon rotation of a steering wheel by an operator of the vehicle. Rotation of the steering wheel actuates a power steering control valve 22 to port fluid from an engine driven pump 24 and supply conduit 26 to either one of a pair of motor conduits 28 and 30. The high pressure fluid conducted from the supply conduit 26 through one of the motor conduits 28 or 30 effects operation of a power steering motor 31 to turn the steerable vehicle wheels. Fluid is conducted from the motor 31 to a reservoir 32 through the other one of the motor conduits 28 or 30, the power steering control valve 22, and a return conduit 34.

The pump 24 is of the well known drooper type. The pump 24 supplies fluid to the power steering control valve 22 at a high fluid flow rate when the pump is being driven at a relatively low speed by the engine of the vehicle. The pump 24 supplies fluid to the power steering control valve 22 at a low fluid flow rate when the pump is being driven at a relatively high speed by the engine of the vehicle. Thus, the fluid flow from the pump 24 is a maximum when engine of the vehicle is idling and the vehicle is stationary. The fluid flow from the pump 24 decreases as vehicle speed increases. Pump having a drooper type construction are disclosed in U.S. Pat. Nos. 2,835,201; 3,349,714; and 4,681,517. Of course there are other known pumps having a drooper type construction.

The power steering control valve 22 includes an inner motor control valve member 40 and an outer motor control valve member or sleeve 42. The outer motor control valve member 42 is cylindrical and encloses the inner motor control valve member 40. The inner motor control valve member 40 and outer motor control valve member 42 are rotatable relative to each other and to a housing 44 about a common central axis 46.

The inner valve member 40 is formed as one piece with a cylindrical input member or valve stem 50 which is connected with the steering wheel. The one piece outer valve member 42 is connected with a follow-up member 54 by a pin 56. The follow-up member 54 is rotatably supported in the housing 44 by bearings 58 and 60. The follow-up member 54 also provides a pinion gear 64 which is disposed in meshing engagement with a rack 66. The rack 66 is connected with the power steering motor 31 and steerable vehicle wheels.

The power steering control valve 22 (FIG. 1) is of the open center type. Therefore, when the power steering control valve is in an initial or unactuated condition, fluid pressure from the pump 24 is conducted through the motor conduits 28 and 30 to motor cylinder chambers 72 and 74 on opposite sides of a piston 76 in the power steering motor 31. Also, fluid flow from the pump 24 is directed by the power steering control valve 22 to the return conduit 34 and reservoir 32.

Upon rotation of the steering wheel and rotation of the valve stem 50, the inner valve member 40 is rotated about the axis 46, relative to the housing 44 and outer valve member 42. This directs high pressure fluid from the pump 24 to one of the motor conduits 28 or 30 and directs fluid from the other motor conduit to the reservoir 32.

For example, rotation of the inner valve member 40 in one direction relative to the outer valve member 42 will reduce the extent of communication of the motor conduit 28 with the reservoir 32 and increase the extent of communication of the motor conduit 28 with the pump 24. This results in high pressure fluid from the pump 24 being conducted to the motor cylinder chamber 72. This high pressure fluid moves the piston 76 toward the right (as viewed in FIG. 1). As the piston 76 moves toward the right (as viewed in FIG. 1), fluid discharged from the chamber 74 is conducted through the motor conduit 30 to the reservoir 32 through the return conduit 34.

As the power steering motor 31 operates, the rack 66 rotates the pinion 64 and follow-up member 54. This rotates the outer valve member 42 relative to the inner valve member 40. When the power steering motor 31 is operated to turn the steerable vehicle wheels 14 and 16 to an extent corresponding to the extent of rotation of the inner valve member 40, the rack 66 rotates the pinion 64 through a distance sufficient to move the outer valve member 42 to its initial position relative to the inner valve member. When this occurs, the fluid pressure in the motor cylinder chambers 72 and 74 equalizes and the motor 31 stops operating.

When the power steering control valve 22 is in the initial position, fluid pressure from the pump 24 is conducted to an annular central groove 80 formed in the outer valve member 42. Fluid flows to the inside of the cylindrical outer valve member 42 through a pair of diametrically opposite passages 82 and 84. The inner valve member 40 has a generally square cross sectional configuration with rounded corners which cooperate with axially extending grooves formed inside the outer valve member 42. The ends of one pair of diametrically opposite grooves on the inside of the outer valve member 42 are connected in fluid communication with an annular outer groove 88 connected with the motor conduit 28. A second pair of diametrically opposite and axially extending grooves on the inside of the outer valve member 42 are connected in fluid communication with an annular outer groove 90 formed in the outer valve member and connected with the motor conduit 30.

A pair of diametrically opposite openings 94 extend radially inward to an axially extending central passage 96 (FIGS. 2 and 3) in the inner valve member 40. The central passage 96 is connected in fluid communication with an annular return chamber 98 (FIG. 1) disposed above the outer valve member 42. The chamber 98 is connected in fluid communication with the reservoir 32 by the return conduit 34.

The inner and outer valve members 40 and 42 are interconnected by a torsion bar 102 (FIGS. 2 and 3) which is disposed in the axially extending return fluid passage 96. One end of the torsion bar 102 is connected to the valve stem 50 and the opposite end of the torsion bar is connected to the follow-up member 54 (FIG. 1). The torsion bar 102 twists to enable relative rotation between the inner and outer valve members 40 and 42 to occur and when free urges the inner and outer valve members 40 and 42 to their initial positions.

The inner and outer valve members 40 and 42 have the same construction and cooperate with each other and the torsion bar 102 in the same manner as is described in U.S. Pat. No. 4,276,812 issued Jul. 7, 1981 and entitled "Power Steering Valve and Method of Making the Same". However, the inner and outer valve members 40 and 42 could have a different construction if desired.

Power Steering Resistance Control System

A power steering resistance control system 110 (FIG. 1) decreases the force which is required to actuate the power steering control valve 22 as vehicle speed decreases. Thus, at relatively low vehicle speeds, a small force is required to rotate the inner valve member 40 relative to the outer valve member 42. At relatively high vehicle speeds, a larger force is required to rotate the inner valve member 40 relative to the outer valve member 42.

The power steering resistance control system 110 includes a pressure responsive control unit 112. The pressure responsive control unit 112 includes a force transmitting assembly 114. The force transmitting assembly 114 includes an annular force transmitting member or slider 116 (FIG. 1) which is disposed in the power steering control valve housing 44. The force transmitting member 116 rotates about its central axis 46 with the inner valve member 40 and valve stem 50. Although the force transmitting member 116 rotates with the inner valve member 40 and valve stem 50, the force transmitting member 116 is movable axially along the valve stem 50.

Figure 2:
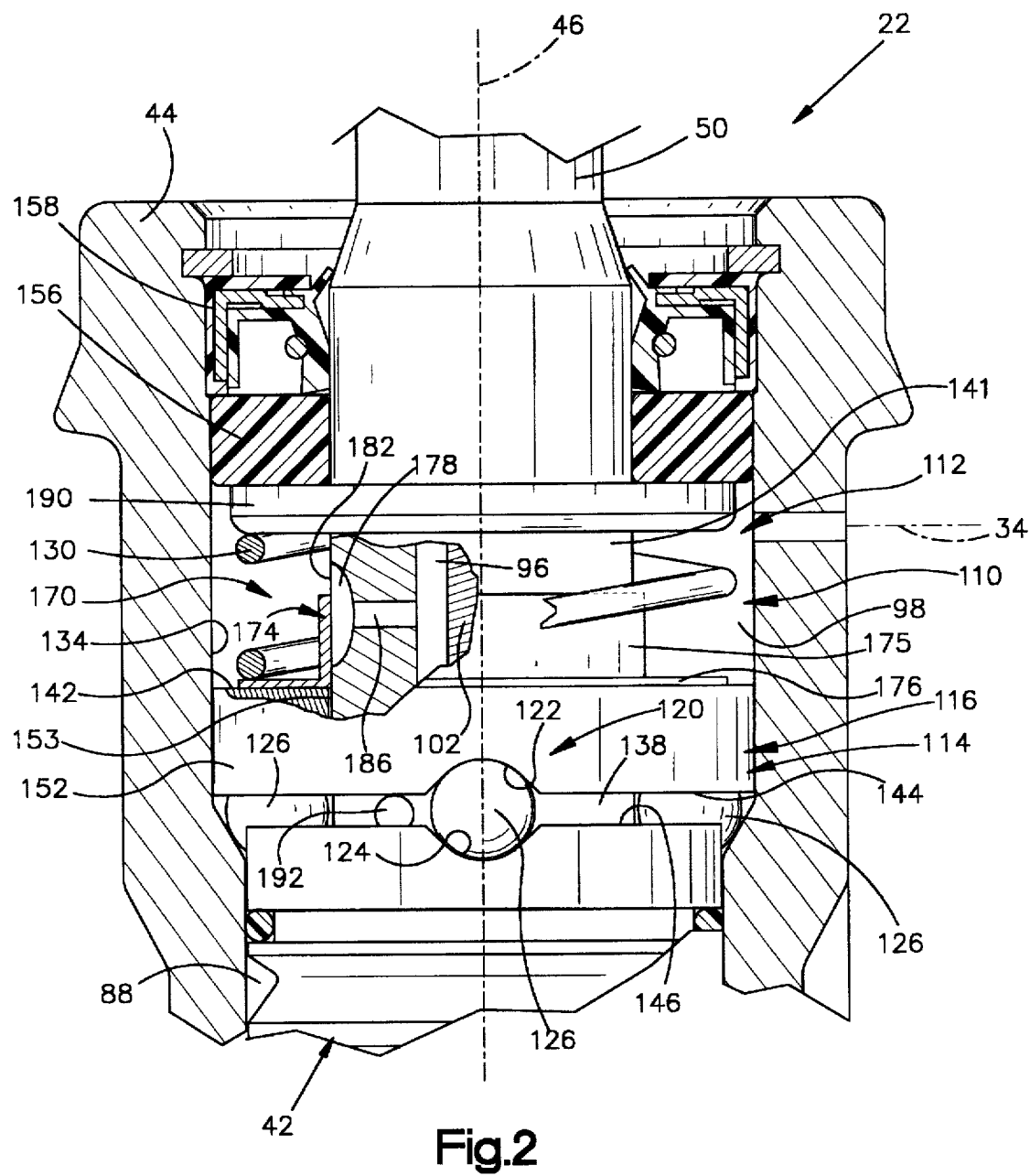
FIG. 2 is an enlarged fragmentary sectional view of a portion of FIG. 1.

The force transmitting assembly 114 also includes a cam assembly 120 (FIG. 2). The cam assembly 120 includes a plurality of downward (as shown in FIG. 2) facing cam surfaces 122 on the force transmitting member 116, a plurality of upward (as shown in FIG. 2) facing cam surfaces 124 on the outer valve member 42, and a plurality of balls or spherical cam elements 126. In the illustrated embodiment of the invention, there are four cam elements or balls 126 disposed between four pairs of cam surfaces 122 and 124 formed on the force transmitting member 116 and outer valve member 42. However, a greater or lesser number of cam elements 126 and cam surfaces 122 and 124 could be used if desired.

The force transmitting member 116 is urged axially toward the outer valve member 42 by a coil spring 130 which is disposed in a coaxial relationship with and circumscribes the valve stem 50. The downward force applied against the force transmitting member 116 by the coil spring 130 presses the cam surfaces 122 and 124 against opposite sides of the balls 126. The downward force applied against the balls 126 by the force transmitting member 116 centers the balls on the cam surfaces 122 and 124.

The annular force transmitting member 116 cooperates with a cylindrical inner side surface 134 of the housing 44 and the valve stem 50 to form the annular return chamber 98 and annular pressure chamber 138 on axially opposite sides of the force transmitting member 116. An annular upper side 142 of the force transmitting member 116 cooperates with the cylindrical inner side surface 134 of the housing 44 to partially define the return chamber 98. Similarly, an annular lower side 144 of the force transmitting member 116 cooperates with the inner side surface 134 of the housing 44 and the outer side surface 141 of the valve stem 50 to partially define the annular pressure chamber 138.

The fluid pressure in the pressure chamber 138 urges the force transmitting member 116 away from the cam elements or balls 126, in opposition to the spring 130. It should be understood that the force applied by the spring 130 against the annular side 142 of the force transmitting member 116 is always greater than the fluid pressure force applied against the annular side 144 of the force transmitting member. Therefore, the cam surfaces 122 on the force transmitting member 116 always remain in abutting engagement with the balls or cam elements 126.

There is a fluid sealing, noninterference, fit between a cylindrical outer side surface 152 (FIG. 2) of the force transmitting member 116 and the inner side surface 134 of the housing 44. There is also a fluid sealing, noninterference, fit between a cylindrical inner side surface 153 of the force transmitting member 116 and the outer side surface 141 of the valve stem. The upper end of the valve housing 44 is sealed by an annular seal ring 156 (FIG. 2) which engages the inner side surface 134 of the housing and the outer side surface of the valve stem 50. A second annular second annular seal ring 158 is provided to further ensure a fluid tight seal.

Rotation of the valve stem 50 and inner valve member 40 relative to the housing 44 and outer valve member 42 is resisted by the pressure responsive control unit 112 with a force which is a function of the difference between the fluid pressure force applied to the side 144 of the force transmitting member 116 and the spring force applied against the side 142 of the force transmitting member. As the valve stem 50 is rotated from the initial position shown in FIG. 2 toward a fully actuated position, the outer side surface on the cam elements or balls 126 roll on the cam surfaces 122 and 124 as the force transmitting member 116 is rotated about the axis 46. As this occurs, the force transmitting member is moved upward from the position shown in FIG. 2 against the influence of the biasing spring 130. As the side 144 of the force transmitting member 116 moves away from an annular upper end 146 of the outer valve member 42, the size of the pressure chamber 138 is increased and the size of the return chamber 98 is decreased.

The force required to roll the spherical force transmitting elements 126 on the cam surfaces 122 and 124 and to move the force transmitting member 116 away from the end 146 of the outer valve member 42 varies as a function of the net force urging the force transmitting member 116 toward the outer valve member 42. Thus, the greater the net force pressing the force transmitting member 116 against the balls 126, the greater is the force required to rotate the valve stem 50 from the initial position of FIG. 2. The net force pressing the force transmitting member 116 against the cam elements 126 is equal to the difference between the force applied by the spring 130 against the side 142 of the force transmitting member 116 and the fluid pressure force applied by the fluid in the chamber 138 against the side 144 of the force transmitting member. The greater the fluid pressure force applied against the side 144 of the force transmitting member 116, the smaller is the force which must be overcome to rotate the valve stem 50 and force transmitting member 116 relative to the outer valve member 42.

A pair of retaining elements or balls (not shown) interconnect the force transmitting member 116 and the valve stem 50 to hold the force transmitting member against rotation relative to the valve stem while allowing the force transmitting member 116 to move axially relative to the valve stem 50. The spherical retaining elements engage a pair of diametrically opposite grooves formed in the valve stem 50 and a pair of axially extending grooves formed in the force transmitting member 116.

The construction of the power steering resistance control system 110 and the manner in which it cooperates with the inner and outer valve members 40 and 42 is the same as is disclosed in U.S. Pat. No. 4,819,545 issued Apr. 11, 1989 and entitled "Power Steering System". However, it should be understood that the power steering resistance control system 110 could have a different construction from the specific construction disclosed herein.

Secondary Valve Assembly

In accordance with a feature of the present invention, a secondary valve assembly 170 is provided to control venting of the pressure chamber 138 (FIGS. 2 and 3) to the return chamber 98. When the secondary valve assembly 170 is in the open condition illustrated in FIGS. 2 and 3, there is a maximum venting of the pressure chamber 138 to the return chamber 98 to minimize the fluid pressure in the pressure chamber.

Upon relative rotation between the inner and outer valve members 40 and 42 to effect operation of the power steering motor 31, the secondary valve assembly 170 is operated from the initial or open condition toward a closed condition. As the secondary valve assembly 170 is operated from the open condition toward the closed condition, it increasingly restricts fluid flow to the return chamber 98. When the secondary valve assembly 170 is in the fully closed condition, it almost completely blocks fluid flow to the return chamber 98. However, there is always some fluid flow through the secondary valve assembly 170 to the return chamber 98.

Figure 3:
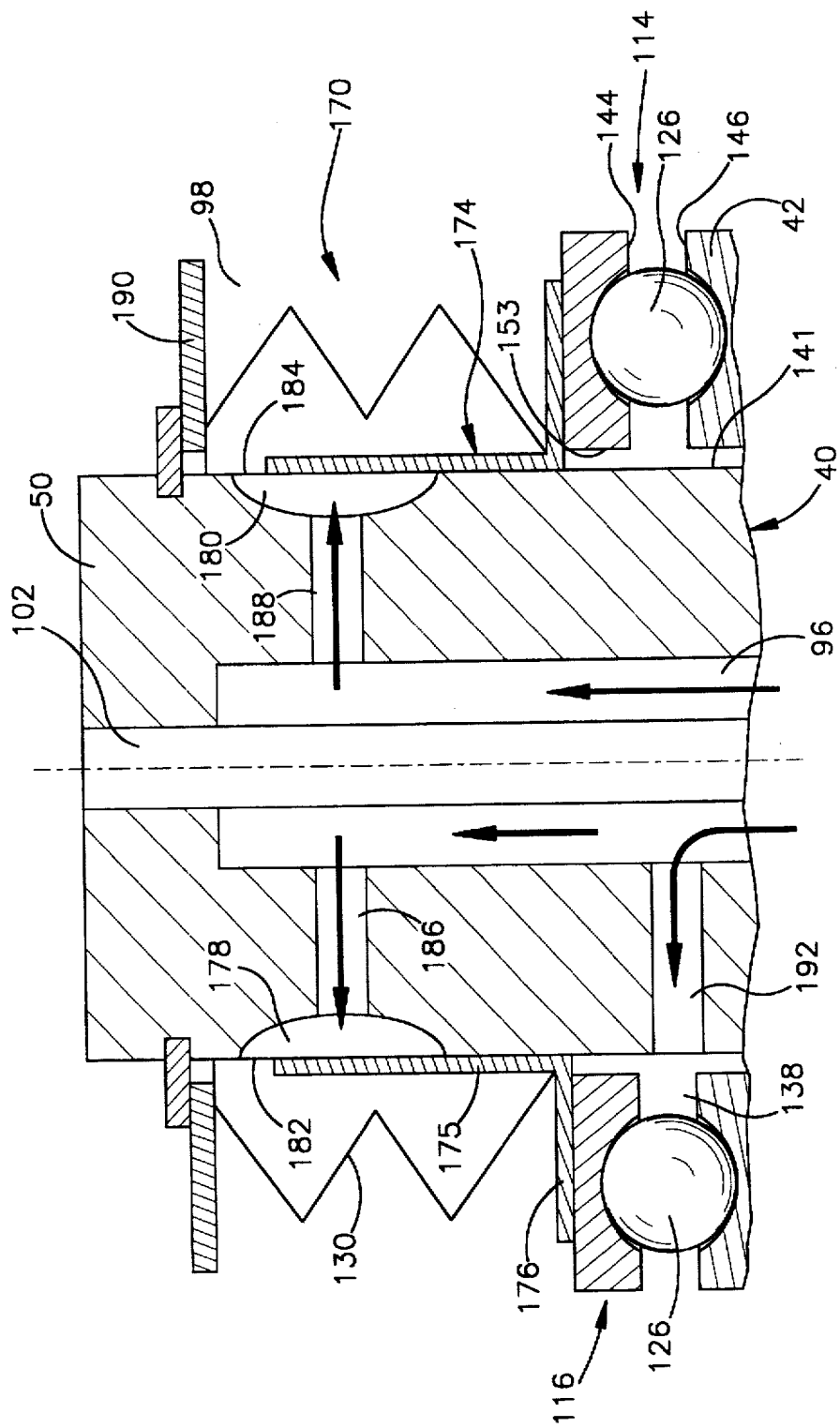
FIG. 3 is an enlarged schematic illustration depicting the manner in which a secondary valve assembly vents fluid pressure in the power steering control valve of FIG. 1.

The secondary valve assembly 170 is actuated from the open condition of FIGS. 2 and 3 toward the closed condition in response to initiation of a vehicle steering action. Thus, upon the occurrence of relative rotation between the inner and outer valve members 40 and 42, the cam assembly 120 moves the force transmitting member 116 upward along the valve stem 50 to initiate operation of the secondary valve assembly 70 from the open condition toward the closed condition. The fluid pressure in the pressure chamber 138 assists the cam assembly 120 in moving the force transmitting member 116 upward along the valve stem 50.

The secondary valve assembly 170 includes a secondary valve member 174 which may be integrally formed as one piece with the force transmitting member 116 or may be formed separately from the force transmitting member, as shown in FIGS. 2 and 3. The secondary valve member 174 includes a cylindrical sleeve 175 which extends around the valve stem 50. The inner side surface of the cylindrical sleeve 175 has a slightly larger diameter than the outer side surface 141 of the valve stem 50. The cylindrical sleeve 175 has a central axis which is coincident with the central axis 46 of the inner valve member 40 and valve stem 50. The secondary valve member 174 also includes an annular flange 176 which is disposed between the lower end of the coil spring 130 and the force transmitting member 116.

The secondary valve member 174 cooperates with arcuate recesses 178 and 180 (FIG. 3) formed in the valve stem 50 to form a pair of variable size orifices 182 and 184. The recesses 178 and 180 and the orifices 182 and 184 are connected in fluid communication with the fluid return passage 96 by radially extending passages 186 and 188 formed in the cylindrical valve stem 50. The return passage 96 is also connected in fluid communication with the pressure chamber 138 through a radially extending passage 192 formed in the valve stem 50.

The secondary valve member 174 is axially movable along the valve stem 50 to vary the size of the orifices 182 and 184. Varying the size of the orifices 182 and 184 varies the extent to which the orifices restrict fluid flow from the return passage 96 to the return chamber 98.

When the inner and outer motor control valve members 40 and 42 are in their initial or unactuated condition, the variable size orifices 182 and 184 are relatively large. This maximizes the extent to which the return passage 96 and pressure chamber 138 are vented to the return chamber 98 through the variable size orifices.

Upon relative rotation between the inner and outer valve members 40 and 42, the balls 126 move the force transmitting member 116 and secondary valve member 174 axially upward (as viewed in FIG. 3). This results in the size of the orifices 182 and 184 being reduced by the secondary valve member 174. As the size of the orifices 182 and 184 are reduced by the secondary valve member 174, the flow of fluid from the return passage 96 through the orifices to the return chamber 98 is restricted.

When the inner and outer valve members 40 and 42 have been rotated to the maximum extent possible relative to each other, the secondary valve member 174 will restrict the orifices 182 and 184 to the maximum extent possible. However, the secondary valve member 174 will never completely block the orifices 182 and 184. Since the secondary valve member 174 does not completely block the orifices 182 and 184, there is minimum flow through the orifices to relieve the fluid pressure in the chamber 138 when the valve members 40 and 42 have been rotated to the maximum extent possible relative to each other.

The coil spring 130 (FIGS. 2 and 3) urges the secondary valve member 174 toward the initial position shown in FIG. 3. Thus, the spring 130 has an upper end portion which engages an annular collar 190 which is fixedly connected with the valve stem 50. The lower end portion of the coil spring 130 engages the flange 176 on the secondary valve member 174 to press the force transmitting member 116 against the balls 126.

When the inner and outer valve members 40 and 42 are returned to their initial or unactuated condition, the coil spring 130 moves the secondary valve member 174 and the force transmitting member 116 downward (as viewed in FIGS. 2 and 3). As this occurs, the size of the orifices 182 and 184 increases. Of course, increasing the size of the orifices 182 and 184 decreases the extent to which the flow of fluid through the orifices is restricted. This results in a decrease in the fluid pressure in the return passage 96 and pressure chamber 138.

Operation

When a vehicle having the power steering system 12 is stationary or moving at a slow speed, the vehicle engine drives the pump 24 at a relatively slow speed. At this time, the rate of fluid flow from the pump 24 is maximized. A relatively high fluid flow rate from the pump 24 is conducted through the return passage 96 and orifices 182 and 184 to the return chamber 98 and return conduit 34.

At this time, the coil spring 130 is effective to hold the secondary valve member 174 in the fully open position shown in FIGS. 2 and 3 so that the size of the orifices 182 and 184 is maximized. However, even when the secondary valve member 174 is in the fully open position, the orifices 182 and 184 are effective to somewhat restrict fluid flow to the return passage 96 so that there is a minimal fluid pressure in the pressure chamber 138. The fluid pressure in the pressure chamber 138 urges the force transmitting member 116 upward, as viewed in FIGS. 2 and 3, to offset some of the force transmitted from the coil spring 130 to the force transmitting member 116.

Upon rotation of the inner valve member 40 relative to the outer valve member 42, the force transmitting member 116 rotates with the inner valve member relative to the outer valve member. This results in the cam surfaces 122 (FIG. 2) on the force transmitting member 116 and the cam surfaces 124 on the outer valve member 42 cooperating with the balls 126 to move the force transmitting member 116 axially upward, as viewed in FIGS. 2 and 3. As the force transmitting member 116 moves upward, the secondary valve member 174 is moved upward to restrict the orifices 182 and 184.

As the orifices 182 and 184 are restricted, the fluid pressure in the return passage 96 and the pressure chamber 138 is increased. Increasing the fluid pressure in the pressure chamber 138 increases the force which opposes the force of the coil spring 130. This results in a decrease the force required to rotate the inner valve member 40 relative to the outer valve member 42. Therefore, the torque required to actuate the power steering control valve 22 is relatively small during operation of the pump 34 at low speeds.

Upon completion of a low speed maneuver, the inner and outer valve members 40 and 42 are rotated back to their initial or unactuated positions relative to each other. As this occurs, the cam surfaces 122 and 124 cooperate with the balls 126 to enable the force transmitting member 116 to move downward, as viewed in FIGS. 2 and 3. As this occurs, the secondary valve member 174 is moved downward and the size of the orifices 182 and 184 is increased.

During operation of the vehicle at higher speeds, the pump 34 is driven at a higher speed and the rate of fluid flow from the pump is reduced. Reducing the rate of fluid flow from the pump 24 reduces the rate of flow of fluid through the return passage 96 and orifices 182 and 184. Due to the low fluid flow rate, the orifices 182 and 184 are relatively ineffective to restrict fluid flow. Therefore, the fluid pressure in the return passage 96 and in the pressure chamber 138 is less than the fluid pressure which was present when the pump 24 was being driven at a low speed. The reduced fluid pressure in the pressure chamber 138 results in the force which offsets the coil spring 130 being reduced.

Upon actuation of the steering control valve 22 by rotation of the steering wheel, the inner valve member 40 is rotated relative to the outer valve member 42. However, since the pump 24 is being driven at a high speed, there is very little fluid pressure in the pressure chamber 138. Substantially the entire force of the coil spring 130 must be overcome by the cam assembly 120 in order to rotate the inner valve member 40 relative to the outer valve member 42.

As the inner valve member 40 rotates relative to the outer valve member 42, the secondary valve member 174 is moved upward, as viewed in FIGS. 2 and 3. As the secondary valve member 174 moves upward, the size of the orifices 182 and 184 is reduced. However, at this time, the pump 24 is being driven at a relatively high speed and, therefore, has a relatively low fluid flow output rate. The low flow rate through the return passage 96 enables the size of the orifices 182 and 184 to be reduced without substantially increasing the fluid pressure in the return passage 96 and pressure chamber 138. Therefore, the input force which is required to turn the steering wheel and rotate the inner valve member 40 relative to the outer valve member 42 is greater when the vehicle is traveling at a relatively high speed than when the vehicle is traveling at a relatively low speed.

When the steering operation is interrupted during operation of the vehicle at a relatively high speed, the inner and outer valve members 40 and 42 are returned to their initial or unactuated positions relative to each other. As this occurs, the balls 126 move along the cam surfaces 122 and 124 and the coil spring 130 moves the force transmitting member 116 to its initial position shown in FIGS. 2 and 3. Upon movement of the force transmitting member 116 to its initial position, the secondary valve member 174 will have been returned to its open position in which the size of the orifices 182 and 184 is maximized.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in a vehicle to control a power steering motor, said apparatus comprising:

pump means for supplying fluid at a high fluid flow rate during operation of said pump means at a low speed and for supplying fluid at a low fluid flow rate during operation of said pump means at a high speed;

first and second valve members connected in fluid communication with said pump means and rotatable relative to each other to control fluid flow from said pump means to the power steering motor;

force transmitting means connected with said first and second valve members for transmitting force to resist relative rotation between said first and second valve members, said force transmitting means being operable between a first condition in which said force transmitting means is effective to transmit a relatively large force to resist relative rotation between said first and second valve members and a second condition in which said force transmitting means is effective to transmit a relatively small force to resist relative rotation between said first and second valve members;

pressure chamber means connected in fluid communication with said pump means for holding fluid under pressure to assist operation of said force transmitting means between the first and second conditions as a function of the fluid pressure in said pressure chamber means; and means responsive to a vehicle steering action and connected in fluid communication with said pressure chamber means for defining an orifice through which fluid pressure is vented from said pressure chamber means, said means for defining an orifice being effective to restrict fluid flow to enable the fluid pressure in said pressure chamber means to increase to a first fluid pressure and assist operation of said force transmitting means from the first condition to the second condition during operation of said pump means at the low speed when flow of fluid from said pump means is at the high fluid flow rate, said means for defining an orifice being ineffective to sufficiently restrict fluid flow to enable the fluid pressure in said pressure chamber means to increase to the first fluid pressure during operation of said pump means at the high speed when flow of fluid from said pump means is at the low fluid flow rate.

2. An apparatus as set forth in claim 1 wherein said means for defining an orifice includes a valve member which is movable to vary the size of the orifice.

3. An apparatus as set forth in claim 1 wherein said force transmitting means includes a force transmitting member which is movable relative to said first and second valve members, said means for defining an orifice including a surface which is movable with said force transmitting member to vary the size of said orifice upon movement of said force transmitting member relative to said first and second valve members.

4. An apparatus as set forth in claim 1 wherein said first valve member includes surface means for at least partially defining a passage through which fluid flow from said pump means is conducted to said orifice, said passage being connected in fluid communication with said pressure chamber means.

5. An apparatus as set forth in claim 1 wherein said means for defining an orifice includes a movable secondary valve member which is mounted on first valve member, said first valve member including a passage through which fluid flow is conducted from said pump to said orifice, said secondary valve member being movable relative to said first valve member to vary the size of said orifice to thereby vary the extent to which said orifice restricts fluid flow from said passage.

6. An apparatus for use in a vehicle to control a flow of fluid to a power steering motor, said apparatus comprising:

a housing adapted to be connected with a fluid supply conduit, the power steering motor, and a drain conduit;

first and second valve members disposed in said housing and rotatable relative to each other to control fluid flow from the fluid supply conduit to the power steering motor;

means disposed in said housing for providing a force to resist relative rotation between said first and second valve members, said means including means for forming a pressure chamber and force transmitting means for transmitting between said first and second valve members force which varies as a function of variations in fluid pressure in said pressure chamber; and a secondary valve operable between an open condition venting said pressure chamber to the drain conduit and a closed condition, said secondary valve being operable from the open condition toward the closed condition in response to relative rotation between said first and second valve members;

said first valve member being rotatable about an axis of rotation relative to said second valve member, said force transmitting means includes a movable member which is movable along the axis of rotation of said first valve member upon relative rotation between said first and second valve members, said secondary valve including a valve member which is movable with said movable member relative to said first valve member to reduce the size of an opening through which said pressure chamber is vented.

7. An apparatus as set forth in claim 6 wherein said secondary valve is effective to restrict fluid communication between said pressure chamber and the drain conduit when said secondary valve is in the closed condition.

8. An apparatus as set forth in claim 6 wherein said force transmitting means includes a force transmitting member connected with said first valve member and movable toward and away from said second valve member and means for varying the resistance to relative rotation between said first and second valve members as said force transmitting member moves relative to said second valve member.

9. An apparatus for use in a vehicle to control a flow of fluid to a power steering motor, said apparatus comprising:

a housing adapted to be connected with a fluid supply conduit, the power steering motor, and a drain conduit;

first and second valve members disposed in said housing and rotatable relative to each other to control fluid flow from the fluid supply conduit to the power steering motor;

means disposed in said housing for providing a force to resist relative rotation between said first and second valve members, said means including means for forming a pressure chamber and force transmitting means for transmitting between said first and second valve members force which varies as a function of variations in fluid pressure in said pressure chamber; and a secondary valve operable between an open condition venting said pressure chamber to the drain conduit and a closed condition, said secondary valve being operable from the open condition toward the closed condition in response to relative rotation between said first and second valve members;

said first valve member including surface means for at least partially defining a passage through which fluid pressure from the fluid supply conduit is conducted to said pressure chamber and through which fluid pressure is conducted to said secondary valve, said secondary valve being operable to decrease the size of an orifice through which said passage is connected in fluid communication with the drain conduit upon relative rotation between said first and second valve members.

10. An apparatus for use in a vehicle to control a flow of fluid to a power steering motor, said apparatus comprising:

a housing adapted to be connected with a fluid supply conduit, the power steering motor, and a drain conduit;

first and second valve members disposed in said housing and rotatable relative to each other to control fluid flow from the fluid supply conduit to the power steering motor;

means disposed in said housing for providing a force to resist relative rotation between said first and second valve members, said means including means for forming a pressure chamber and force transmitting means for transmitting between said first and second valve members force which varies as a function of variations in fluid pressure in said pressure chamber; and a secondary valve operable between an open condition venting said pressure chamber to the drain conduit and a closed condition, said secondary valve being operable from the open condition toward the closed condition in response to relative rotation between said first and second valve members;

said means for providing a force to resist relative rotation between said first and second valve members including a spring which extends around an outer side surface area on said first valve member, said spring being effective to provide a force which urges said first and second valve members toward an initial condition relative to each other upon relative rotation between said first and second valve members away from the initial condition, said spring being effective to urge said secondary valve from the closed condition toward the open condition upon operation of said secondary valve to the closed condition.

11. An apparatus for use in a vehicle to control a flow of fluid to a power steering motor, said apparatus comprising:

a housing adapted to be connected with a fluid supply conduit, the power steering motor, and a drain conduit;

first and second valve members disposed in said housing and rotatable relative to each other to control fluid flow from the fluid supply conduit to the power steering motor;

means disposed in said housing for providing a force to resist relative rotation between said first and second valve members, said means including means for forming a pressure chamber and force transmitting means for transmitting between said first and second valve members force which varies as a function of variations in fluid pressure in said pressure chamber; and a secondary valve operable between an open condition venting said pressure chamber to the drain conduit and a closed condition, said secondary valve being operable from the open condition toward the closed condition in response to relative rotation between said first and second valve members;

said secondary valve including a secondary valve member which cooperates with said first valve member to at least partially define a variable size orifice, said secondary valve member being movable relative to said first valve member to decrease the size of said variable size orifice upon operation of said secondary valve from the open condition toward the closed condition, said secondary valve member being movable relative to said first valve member to increase the size of said variable orifice upon operation of said secondary valve from the closed condition toward the open condition.

12. An apparatus for use in a vehicle to control a flow of fluid to a power steering motor, said apparatus comprising:

a housing adapted to be connected with a fluid supply conduit, the power steering motor, and a drain conduit;

first and second valve members disposed in said housing and rotatable relative to each other to control fluid flow from the fluid supply conduit to the power steering motor;

means disposed in said housing for providing a force to resist relative rotation between said first and second valve members, said means including means for forming a pressure chamber and force transmitting means for transmitting between said first and second valve members force which varies as a function of variations in fluid pressure in said pressure chamber; and a secondary valve operable between an open condition venting said pressure chamber to the drain conduit and a closed condition, said secondary valve being operable from the open condition toward the closed condition in response to relative rotation between said first and second valve members;

said force transmitting means including a force transmitting member connected with said first valve member, said force transmitting member being movable in a first direction relative to said first valve member to operate said secondary valve from the open condition toward the closed condition and to decrease the resistance to relative rotation between said first and second valve members, said force transmitting member being movable in a second direction relative to said first valve member to operate said secondary valve away from the closed condition toward the open condition and to increase the resistance to relative rotation between said first and second valve members.

13. An apparatus as set forth in claim 12 wherein at least a portion of said pressure chamber is disposed between said force transmitting member and said second valve member.

* * * * *